US012135278B2

(12) United States Patent
Zeng et al.

(10) Patent No.: US 12,135,278 B2
(45) Date of Patent: Nov. 5, 2024

(54) LIGHT EMITTING DIODE ARRANGEMENTS FOR GEMSTONE EVALUATION

(71) Applicant: Gemological Institute of America, Inc. (GIA), Carlsbad, CA (US)

(72) Inventors: Jing Zeng, Parsippany, NJ (US); Hiroshi Takahashi, Fort Lee, NJ (US); Jon Neal, Astoria, NY (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 0 days.

(21) Appl. No.: 17/385,895

(22) Filed: Jul. 26, 2021

(65) Prior Publication Data
US 2022/0026351 A1    Jan. 27, 2022

Related U.S. Application Data

(60) Provisional application No. 63/057,173, filed on Jul. 27, 2020.

(51) Int. Cl.
| | |
|---|---|
| *G01N 21/33* | (2006.01) |
| *F21V 3/06* | (2018.01) |
| *F21Y 113/13* | (2016.01) |
| *F21Y 115/10* | (2016.01) |
| *G01N 21/87* | (2006.01) |

(52) U.S. Cl.
CPC ........... *G01N 21/33* (2013.01); *F21V 3/0615* (2018.02); *G01N 21/87* (2013.01); *F21Y 2113/13* (2016.08); *F21Y 2115/10* (2016.08); *G01N 2201/062* (2013.01); *G01N 2201/0634* (2013.01)

(58) Field of Classification Search
CPC ....... G01N 21/33; G01N 21/87; F21V 3/0615
See application file for complete search history.

(56) References Cited

U.S. PATENT DOCUMENTS 6,473,164 B1 * 10/2002 De Jong ................ G01N 21/87
356/30
2008/0218730 A1 * 9/2008 Sasian .................... G01N 21/00
356/30

(Continued)

FOREIGN PATENT DOCUMENTS

TW        201944056 A       11/2019

OTHER PUBLICATIONS

Cowing et al. "The over-grading of blue-fluorescent diamonds: the problem, the proof and the solutions". Journal of Gemmology (2010), vol. 32, p. 1-4. (Year: 2010).*

(Continued)

*Primary Examiner* — Rebecca C Bryant
(74) *Attorney, Agent, or Firm* — DLA Piper LLP (US)

(57) ABSTRACT

Some examples herein include systems and methods of creating standards of gemstones of various classifications, which may display certain characteristics of the various classifications when excited by ultraviolet radiation and fluoresce in response. In some examples, a set of standards are created using fluorescent material, filters, and a radiation source to compare against a sample gemstone. In some examples, specific Light Emitting Diodes are selected to illuminate the gemstone samples under analysis.

13 Claims, 6 Drawing Sheets

(56) References Cited

U.S. PATENT DOCUMENTS

| | | | |
|---|---|---|---|
| 2011/0206234 A1* | 8/2011 | Benderly | G01N 21/8806 |
| | | | 362/249.02 |
| 2016/0290925 A1* | 10/2016 | Takahashi | G01N 21/87 |
| 2019/0064511 A1 | 3/2019 | Chan | |
| 2019/0094511 A1* | 3/2019 | Chan | G02B 21/16 |

OTHER PUBLICATIONS

King et al., "Color Grading 'D-to-Z' Diamonds at the GIA Laboratory", Gems & Gemology, Winter 2008, p. 296-321. (Year: 2008).*

Speich and Chalain, "A new led daylight source for diamond colour grading," https://www.ssef.ch/a-new-led-daylight-source-for-diamond-colour-grading/, Jun. 2021.*

Cowing, "The over-grading of blue-fluorescent diamonds: the problem, the proof and the solutions", The Journal of Gemmology, 2010, vol. 32, No. 1-4, 14 pages.

King et al.; "Color Grading "D-To-Z" Diamonds at the GIA Laboratory", Gems and Gemology, Winter 2008, vol. 44, No. 4, pp. 296-321, Gemological Institute of America, 26 pages.

Dr. Schmetzer, "High pressure high temperature treatment of diamonds—a review of the patent literature from five decades (1960-2009)", The Journal of Gemmology, 2010, vol. 32, No. 1-4, 1 page.

\* cited by examiner

LIGHT EMITTING DIODE ARRANGEMENTS FOR GEMSTONE EVALUATION

CROSS REFERENCE

This application relates to and claims priority from U.S. Provisional Application No. 63/057,173 filed on Jul. 27, 2020, the entirety of which is hereby incorporated by reference.

TECHNICAL FIELD

This application relates to the field of gemology and the use of lights for analysis. In some examples, the gemological study includes the use of a spectrum of light.

BACKGROUND

The study of gemstones often includes analysis of gemstones under similar light conditions in order to properly standardize the process. In the past, analysis was done between the hours of 10 am and 2 pm in the northern hemisphere in order to utilize sunlight for analysis. Although using good sunlight resulted in a wavelength curve that was beneficial to analysis, such analysis was hindered by weather conditions. Later, incandescent bulbs were utilized, some coated in materials such as blue dye or paint. Such analysis was hindered by a wavelength curve that favored longer wavelengths. Later, fluorescent lamps were utilized. Such analysis was hindered by a wavelength curve with several spikes that did not mimic sunlight. Further, drawbacks using incandescent bulbs and fluorescent bulbs include heat generation, electricity usage, and waste from bulb burnouts and replacements.

It would be beneficial to come up with a daylight approximating artificial light source that did not generate much heat and did not require frequent bulb replacements.

SUMMARY

Some examples presented here include systems and methods of arranging light emitting diodes in an arrangement that approximates daylight.

Example systems may include a main body including a stage and a radiation source, a stage, where the radiation source includes a combination of Ultraviolet (UV) Light Emitting Diodes (LEDs), Red LEDs, and White LEDs. In some examples alternatively or additionally, the UV LEDs produce a wavelength between 350-400 nm. In some examples alternatively or additionally, the UV LEDs produce a wavelength about 365 nm. In some examples alternatively or additionally, the Red LEDs produce a wavelength between 650-700 nm. In some examples alternatively or additionally, the Red LEDs produce a wavelength about 650 nm. In some examples alternatively or additionally, the main body includes a light diffuser. In some examples alternatively or additionally, the light diffuser is a 100/100 grid diffuser examples alternatively or additionally, the radiation source is detachable from the main body. In some examples alternatively or additionally, the white LEDs produce a Correlated Color Temperature (CCT) between 5500K-6500K. In some examples alternatively or additionally, the white LEDs produce a Correlated Color Temperature (CCT) of about 6000K LED as a base spectrum. In some examples alternatively or additionally, the white LEDs have a Color Rendering Index (CRI) above 90. In some examples alternatively or additionally, the white LEDs have a Color Rendering Index (CRI) above 95.

BRIEF DESCRIPTION OF THE DRAWINGS

For a better understanding of the technology described in this document, as well as any embodiments thereof, reference should be made to the description below, in conjunction with the following figures in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments.

Gemstone Grade Overview

Traditionally, precious stones, referred to interchangeably herein as gems, gemstones, and/or diamonds, may be graded using four main aspects: Cut, Carat, Clarity, and Color. Cut refers to the physical shape the gem is cut into. Carat refers to the weight of the gem. Clarity refers to the impact of inclusions and blemishes in the gem. Color refers to the visible color of the gem. These characteristics may be used to grade gemstones by gemologists, and they also provide a way of identifying a gemstone. Understanding and identifying these characteristics is useful on several levels, including the establishing of a gem's market value and help in making the right choices when setting the gems in jewelry.

Gem color evaluation, for example, is based on the absence or presence of color, as well as hue, saturation and tone of that color. In some examples, gems which include no defects, inclusions or impurities do not absorb visible light and thus produce no color under the appropriate light conditions. In other examples, gems that include chemical impurities, inclusions and/or defects may absorb visible light to appear colored. And in many examples, diamond color distinctions are so subtle that they are difficult to discern by the human eye; however, these distinctions may make a difference in gem quality grading and therefore price.

A standard color scale used to grade diamonds ranges from D to Z, with D being colorless, and Z being light yellow or light brown. A chemically pure and structurally perfect diamond has no color and consequently, it may be given a higher grade and therefore, a higher value.

System Examples

As discussed, in order to analyze an ungraded sample gem, a sample gem may be graded by a human or machine vision system to grade its visual color. When analyzing color, the radiation used to illuminate the sample gem may affect the way the sample gem looks, and how it reacts. One feature of the radiation was consistency, the other was approximation to real sunlight. If a consistent sun-like radiation was used, analysis could be more accurate and consistent.

In the past, gemologists used different radiation sources to analyze gemstones. This ranged from natural sunlight, usually mid-day to avoid sunrise and sunset colors. Artificial radiation sources were later used such as incandescent light bulbs and fluorescent light bulbs. Various filters, paints, and dyes were used to provide different wavelengths for analysis. But these artificial systems had drawbacks including short life time, inconsistent and unstable light spectrum and large deviation from sunlight spectrum.

The "correlated color temperature" (CCT; or just "color temperature") is another aspect of a light source. This term may be used to describe the overall color of "white" light sources, and the "temperature" is most commonly expressed in units of kelvin (K). Incandescent lighting may have color temperatures around 2000-3000 K and may be generally referred to as being "warm" light. Common fluorescent lighting in general, with a CCT of 4500 K or higher, may be considered "cool." The use of warm and cool with regard to lights refers to the color appearance of the light; the temperature designations could lead one to think the reverse. To simulate north daylight, a light source should be much "cooler" or "whiter" and have a color temperature in the 5500-6500 K range. Lighting manufacturers often refer to the light's color rendering index (CRI) as an important criterion as well. In general, CRI may be a quantitative measure of a specific light source's ability to reproduce colors faithfully in comparison with an ideal or natural light source (CIE and IEC, 1987). On a scale of 0 to 100, lights with 90 or higher are generally preferred for tasks requiring color differentiation. When choosing a lamp, one may utilize the CRI and the color temperature of the light source in conjunction with both its complete spectrum and the specific regions that can affect D-to-Z color grading.

In researching practical solutions for the laboratory and the trade, requires that the lamp be energy efficient, widely available in the marketplace, and reason-ably priced. (Information on lighting criteria and explanations of these and other terms used regarding lighting can be found on many lighting websites. The basic technical specifications for the lighting used for D-to-Z color grading may include: stable, fluorescent lamps 17 inches (43 cm) or longer; an intensity of light in the range of 2000-4500 lux at the surface of the grading tray; an 8 to 10 inch distance between the lamps and the grading tray; a color spectrum close to CIE D55-D65; a color temperature between 5500K and 6500K; a color rendering index of 90 or above; a high-frequency (>20,000 Hz) electronic ballast; a light ballast with efficiency (power factor) above 0.5 (50%); no noticeable output in the short or medium wave UV range (or a filter available to eliminate UV in this range; an emission for long-wave UV (between 315 and 400 nm, close to the reference spectrum of D55-D65).

Figure 1:
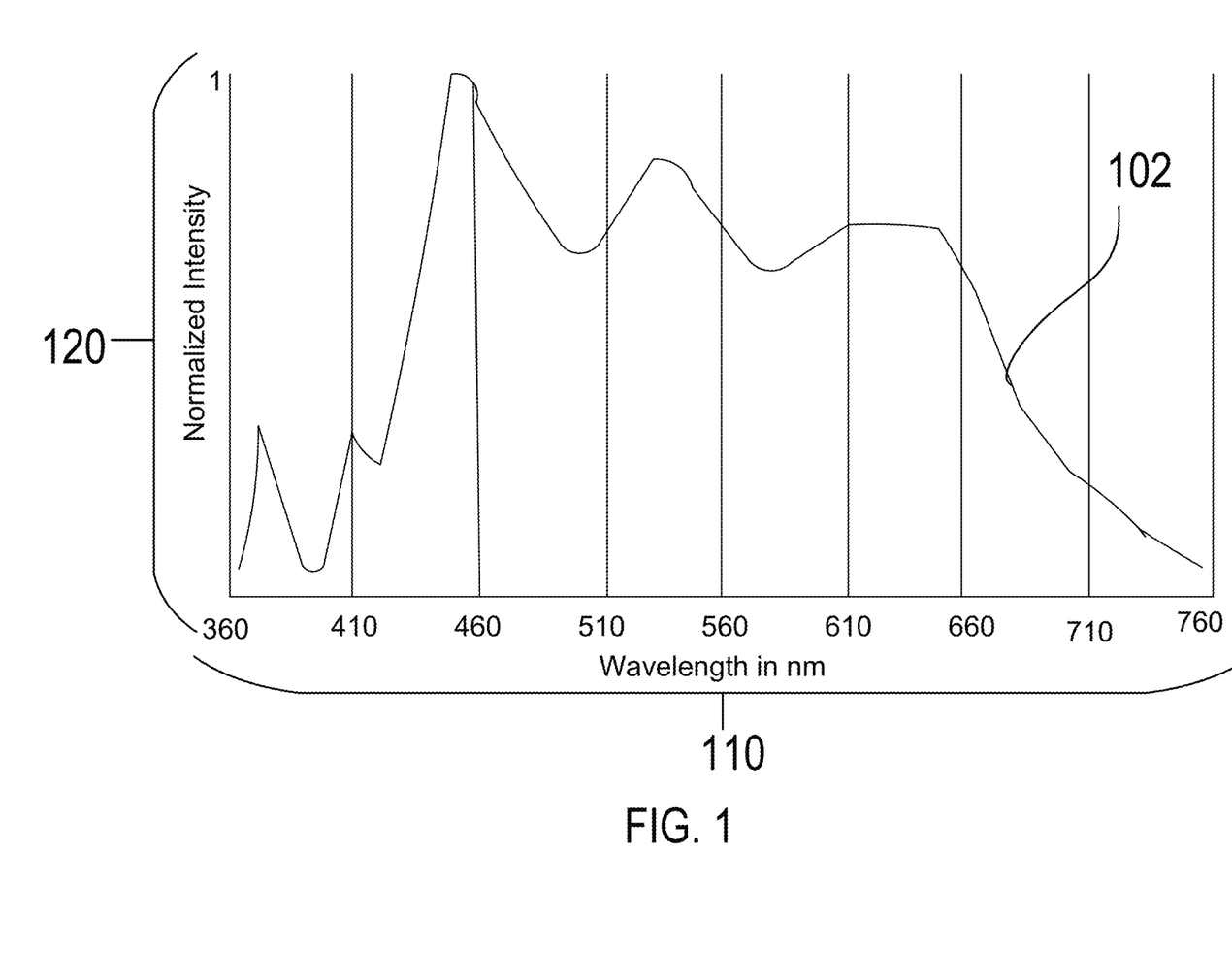
FIG. 1 shows an example spectrum graph according to the embodiments described herein.

Recently, the introduction of light emitting diodes, or LEDs was introduced to gemology. Systems and methods here employ specific layouts of LEDs, which may be used in viewing and analyzing stages to approximate sunlight and provide for consistent spectrums under which to view and analyze gemstones. FIG. 1 shows an example graph of an LED spectrum 102 plotted against wavelength on the X axis in nm 110, and normalized intensity in Y axis 120, with a CCT of 5989 K, with a CRI of 95.

Figure 2:
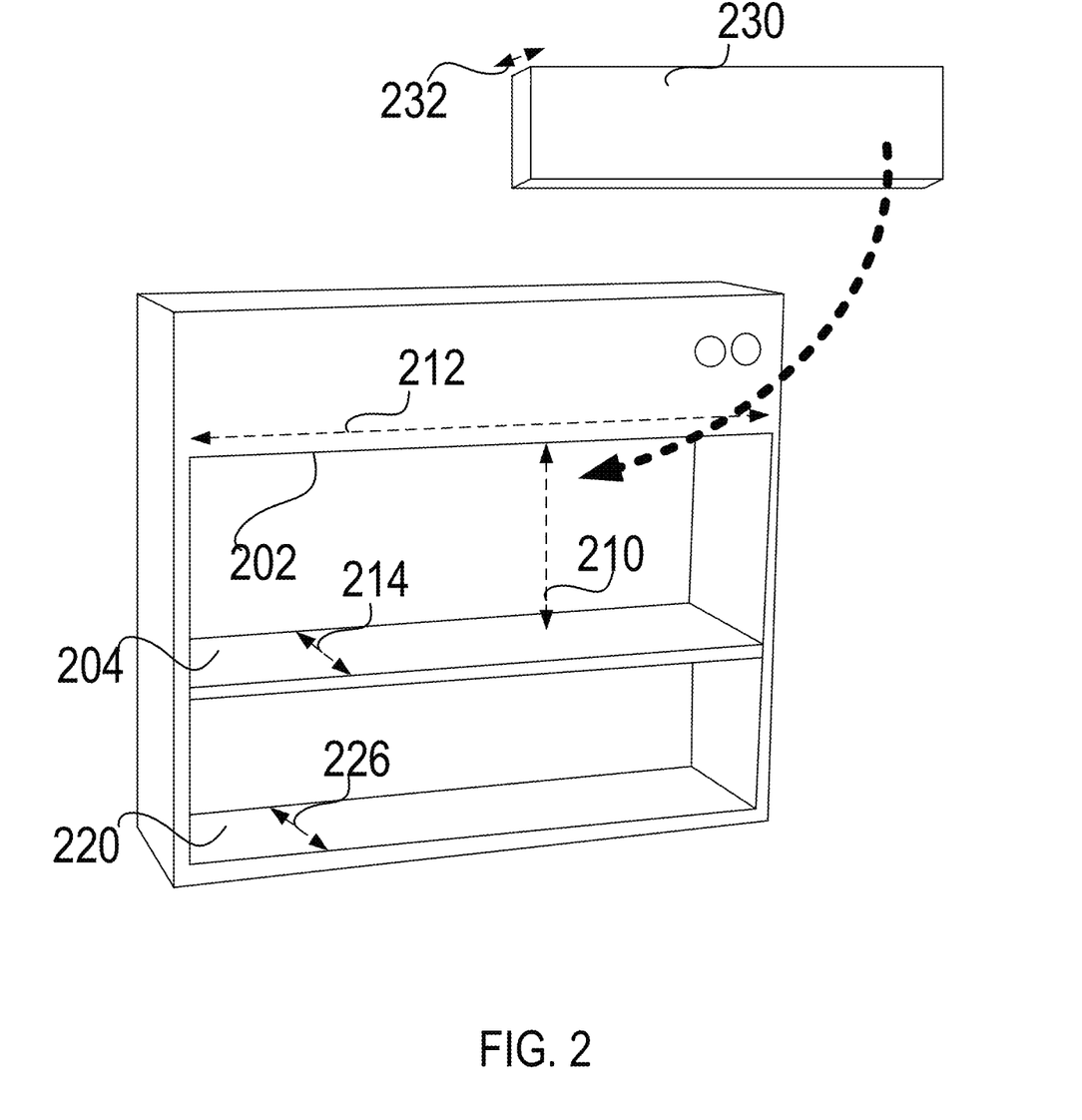
FIG. 2 show an example stage embodiment according to the embodiments described herein.
Figure 4:
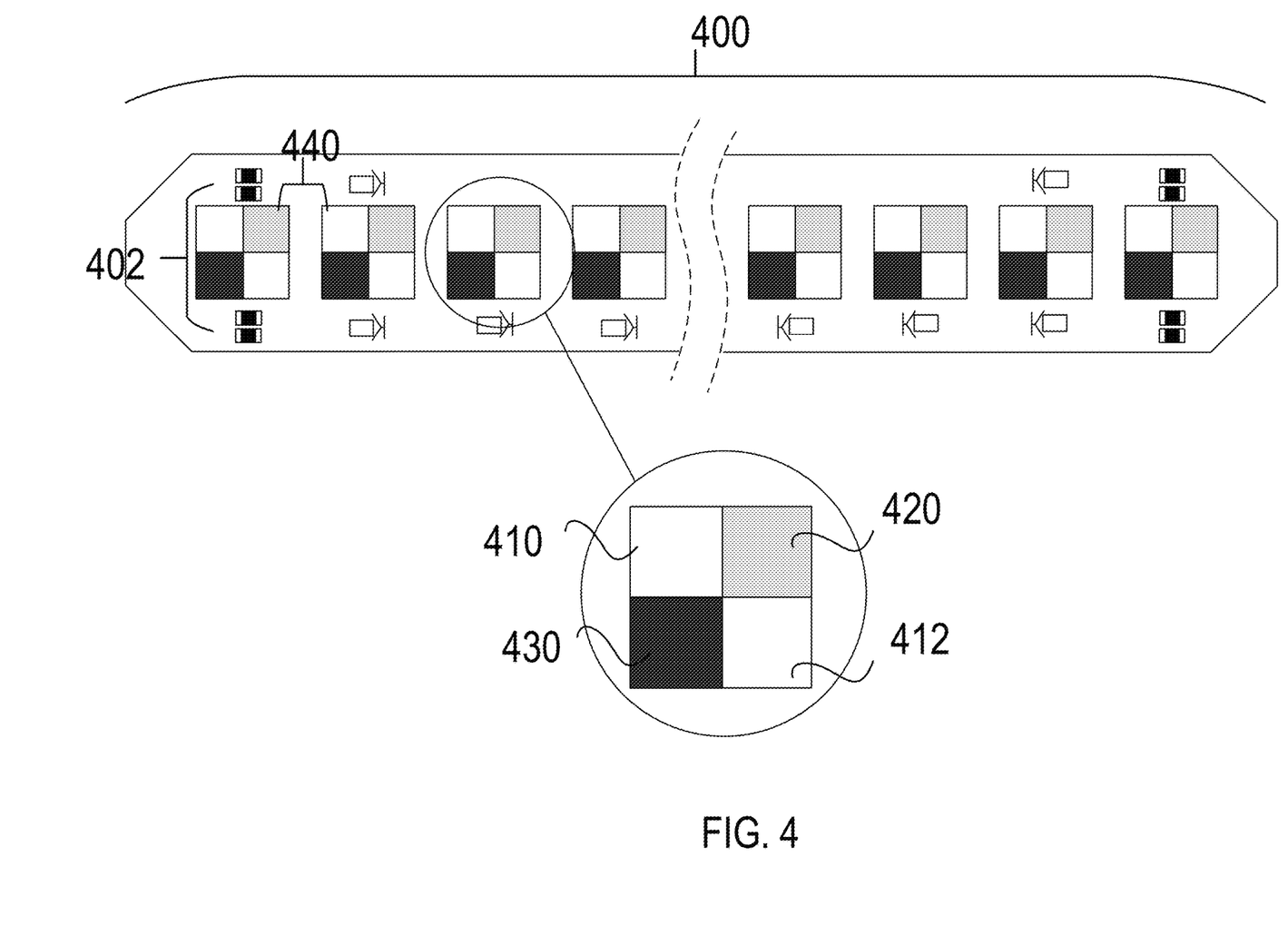
FIG. 4 show an example light arrangement embodiment according to the embodiments described herein.
Figure 5:
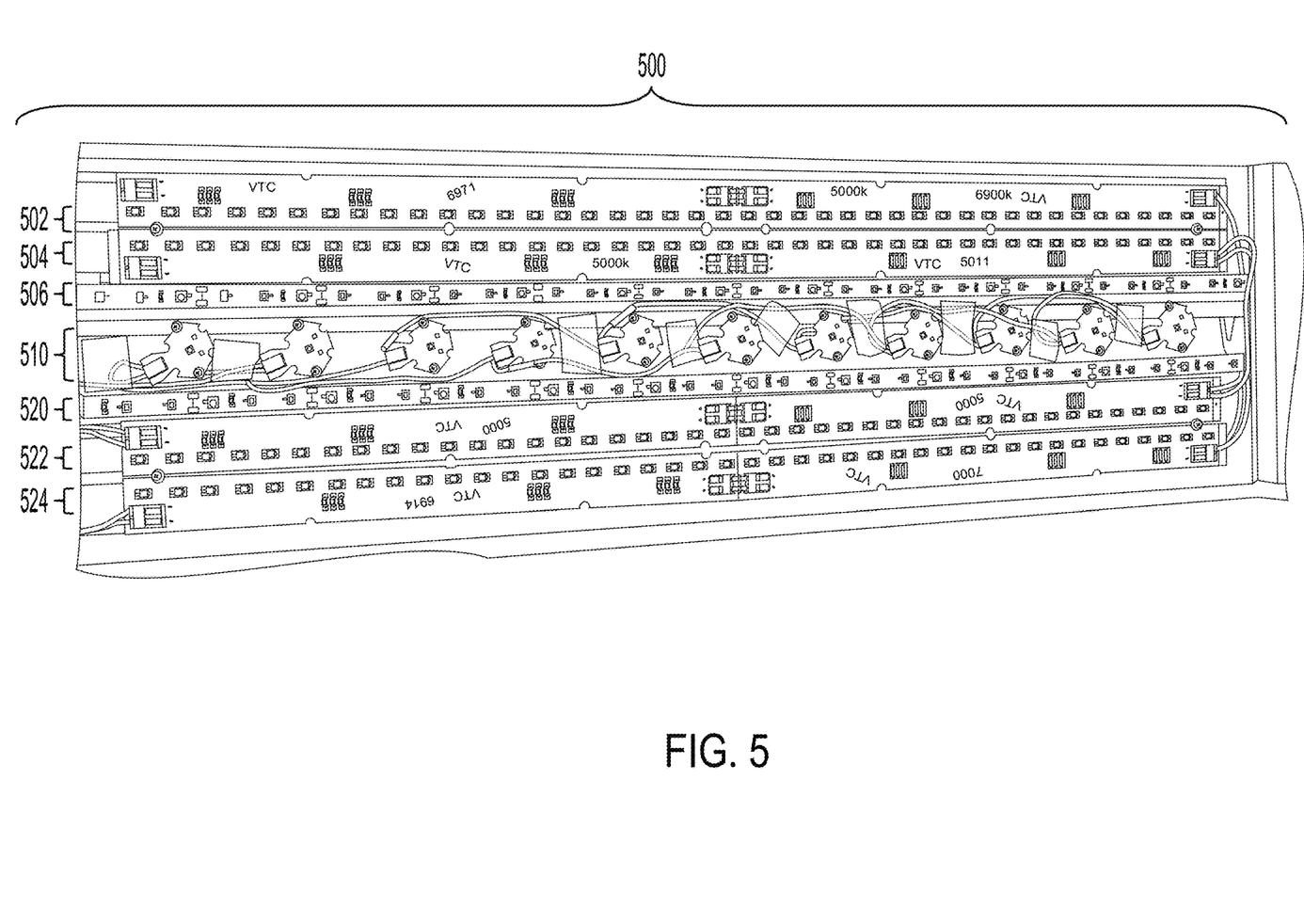
FIG. 5 show another example light arrangement embodiment according to the embodiments described herein.

FIG. 2 shows an example stage system 250 which may be used to expose a sample gem to daylight approximating radiation using LED arrangements described herein including FIGS. 4 and 5, in some examples, to analyze as described herein. In some example embodiments, the system in FIG. 2 may include a platform 204 for positioning any number of sample gemstones, a radiation source 202 such as but not limited to light emitting diodes (LED) to provide illumination for the platform 204 as described herein. Such a radiation source 202 may include all the components necessary to provide the radiation, such as but not limited to a switch, power supply such as a battery or plug adapter, and an LED source as described herein. In some examples, the light stage and LED arrangements may include or be in communication with computing systems as described in FIG. 6. Further discussion of the details of example LED radiation sources 202 may be found below.

In some examples, the distance 210 from the stage floor 204 and the radiation source 202 is 8 inches. In some examples, the distance 210 may be between 6-10 inches. In some examples, distance 210 may be between 7-9 inches.

In some examples, the internal width 212 of the stage 204 may be 25 inches. In some examples, the width 212 of the stage 204 may be between 20-30 inches.

In some examples, the depth 214 of the stage 204 may be 6 inches, and in some examples, the depth 214 may be 8 inches and a white background plate 230 may be added to the rear of the stage 204 which would decrease the stage 204 depth 214 to 6 inches. In such examples, the white background plate 230 may be 2 inches deep 232, or be placed on the stage 204 covering the back two inches of the depth 214. In some examples, the depth 214 of the stage may be between 10-6 inches.

In some examples, a lower platform 220 may support the system and/or raise up the stage 204 for the gemstone analysis. In some examples, the depth 216 of the lower platform 220 is 8 inches because the lower platform 220 may not include the white background plate 230.

The examples above, of dimensions of the stage and lighting apparatus in FIG. 2 are not intended to be limiting and could cover different ranges as described.

Illumination Examples

Under the radiation source 202, the grading may take place based on the characteristics of the sample gem. But radiation may be presented in many various wavelengths, and the practical generation of such UV radiation sources may come from many sources. Therefore, it may be advantageous to determine a preferred wavelength ranges of radiation for grading, and also the corresponding source to create those wavelengths.

In some examples, alone or in combination, a combination of light sources may be used to create a range of radiation wavelengths suitable for grading in a system such as that shown in FIG. 2. Such a combination may be arranged in various ways, such as those described herein. In some examples, a preferred embodiment may be to utilize LEDs as a radiation source. Such LEDs may be performing to a specific wavelength of white, red, and UV radiation for exposing to gems.

In some examples, the intensity of the light source 202 may be in the range of 2000-4500 lux at the stage 204.

In some examples, the color spectrum of the light source 202 may be in the range of close to CIE D55-D65 at the stage 204.

In some examples, the correlated color temperature of the light source 202 may be in the range of 5500K and 6500K at the stage 204.

In some examples, the color rendering index of the light source 202 may be in the range of 90 or above at the stage 204.

In some examples able output in the short or medium wave UV range or a filter available to eliminate UV in this range may be used.

In some examples, some of the light sources in the overall system may have an emission wavelength for red light between 600-700 nm. In some examples, the red light may have an emission wavelength of around 650 nm.

In some examples, some of the light sources in the overall system may have an emission wavelength for UV light between 300-400 nm. In some examples, the UV light may have an emission wavelength of around 365 nm. In some examples, an emission wavelength for long wave UV between 315 and 400 nm may be used. In some examples, such UV source has a wavelength between 365 nm to 400 nm. In some examples, this range is approximate, and the wavelength is between 350 nm and 420 nm. In some examples, UV wavelength may be close to the reference spectrum of D55-D65.

Systems here may be even able to improve existing LED technology white light by augmenting a UV light and red light along with one or more white lights. In some examples of the systems here, LEDs may be advantageous because LEDs may produce different spectra useful for gemstone analysis. Further, LEDs may be more stable, lower cost, longer life, and save energy over other standards such as fluorescence light sources. However, an off-the-shelf white LED may not produce the results required for gemstone analysis as described herein.

Figure 3:
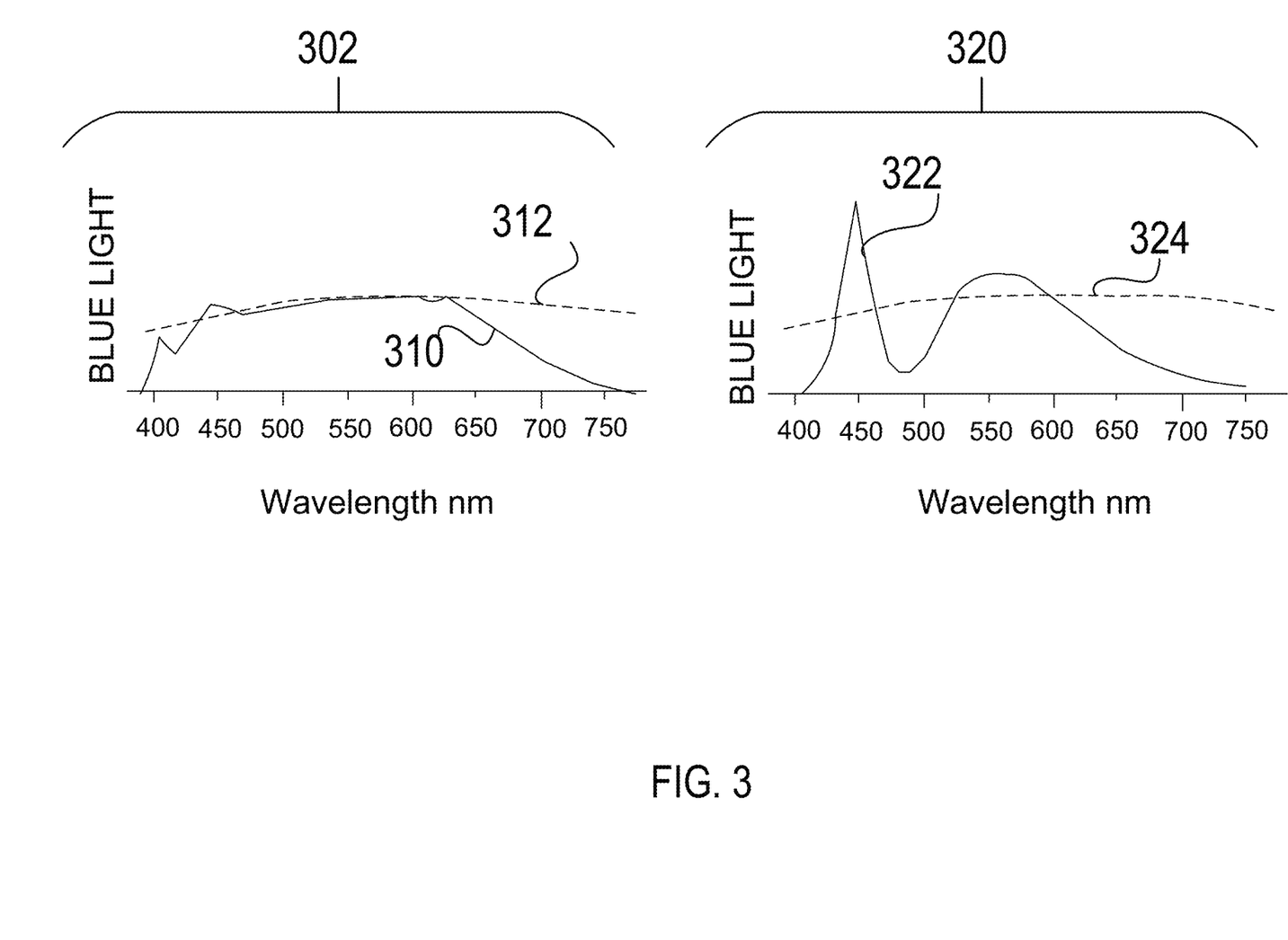
FIG. 3 shows an example spectrum graph according to the embodiments described herein.

In FIG. 3, 302 shows an example spectrum graph of white light LED technology with wavelengths 310 capable of mimicking sunlight 312. In some examples, a combination of two types of CCT LEDs for example, combinations such achieve an average of 6000K.

In some examples, one may be 6500K and another 5700 K. In some examples, these may be made by different vendors such as Sunlike series from SeoulSemi and VTC Series from Yujiintl, but many options may be used. In some examples, the VTC series offer CCT type at 2700K, 3200k, 4000k, 5000K, 5600K and 6500K; Sunlike series from Seoul Semi may offer CCT Type at 2700K, 3000K, 3500K, 4000K, 5000K, 5700K and 6500K. In some examples, CCT options for LED groups could be be: one group belong to 6000K or lower, other group belongs to 6000K or higher. In some examples, a qualified 6000K LED may be used.

In contrast, an older conventional LED 320 may emit a wavelength curve 322 that is not nearly as close to a sunlight spectrum 324. Such a conventional LED may have a blue LED and yellow phosphor, 70-80 CRI and a Low R9 Value (<20, means low deep red light).

In both of the examples of FIG. 3, the wavelength curve is not as close to the approximation of "sun-like" white light as might be useful in analysis of gemstones as described herein. Therefore, augmenting the white light LEDs such as those in 302 with other LEDs may be helpful. In some examples, packs, groups, or clusters of LEDs may be used, each with different parameters, in order to provide a range of light sources that are desired for analyzing gemstones as described in FIGS. 4 and 5.

LED Illumination Arrangement Examples

FIG. 4 shows an example light source 400 where groupings of LEDs 402 may be used as a way to space out different radiation wavelengths in order to provide an overall mix of radiation wavelengths that mimic sunlight and provide an even environment for analyzing gemstones. In some examples, the LED arrangement of FIG. 4 may include or be in communication with a computing system described in FIG. 6. Such a computing system may be configured to turn on and off the LED lights, alone or in combinations programmed for timing. In some examples, such timing may be to change the wavelength spectrums emitted by the different LEDs at different times as described herein.

In some examples shown in FIG. 4, grouping of four LEDs may be repeated along the length of an array. In such examples, the groupings may be spaced about one inch apart 440. In some examples, the groupings of LEDs may be spaced about one half inch apart 440. In some examples, the groupings of LEDs may be spaced one and one half inches apart. Many various spacings of LED groupings may be used, these measurements not intended to be limiting.

In some examples, each grouping of four LEDs, a mix of LED colors may be used. In the example shown, one is a UV LED 430 emitting radiation at around 365 nm; one is a Red LED 420 emitting radiation at around 650 nm; one is a "Sunlike" white LED 410 emitting radiation from between 400 nm and 750 nm and 6500K; one is a "Sunlike" white LED 412 emitting radiation from between 400 nm and 750 nm and 5700K.

In some examples, not only are mixes of wavelengths used, but mixes of correlated color temperature as well. In this example, color temperature is used to describe the light appearance provided by a light source. It is measured in degrees Kelvin (K) on a scale from 1,000 to 10,000.

In some examples, the multiple white LEDs may include one CCT group 6000K or lower, and another group 6000K or higher. In some examples, multiple white LEDs may be used at 5700K and 6500K in order to average out near 6000 K.

In some examples, the red light LEDs 420 may emit radiation with wavelengths between 600-700 nm. In some examples, the red light may have an emission of around 650 nm.

In some examples, the UV LEDs 430 may emit radiation with wavelengths between 300-400 nm. In some examples, the UV light may have an emission of around 365 nm.

In some examples the LEDs have illuminance between 2000-4500 lux when measured at the grading tray (204 in FIG. 2).

In some examples, the LED Correlated Color Temperature (CCT) may be between 5500 K-6500 K. In some examples, the CCT may be 6000 K LED as the base spectrum. In some examples, 6000 K may be achieved by having two sources near each other, one set to 5500K and the other to 6500K with the blend resulting in 6000K. In some examples, one group belong to 6000K or lower, other group belongs to 6000K or higher. In some examples, a custom 6000K LED CCT system may be built and arranged without blending.

In some examples, the LED Color Rendering Index (CRI) may be above 90. In some examples, the LED embodiments may have accurate, or high CRI above 95.

In some examples, instead of groupings of four LEDs, the array of radiation includes groupings of three LEDs. In such examples, one UV, one Red, and one white LED may be used. In such examples, the one white LED may produce a Correlated Color Temperature (CCT) of about 6000 K LED as a base spectrum.

In some examples, groupings of six may be used, such as but not limited to: ~365 nm, 385 nm; ~5500K, 6500K; ~650 nm, 680 nm. In another non-limiting option, ~365 nm, 385 nm; ~6000K, 6000K; ~650 nm, 680 nm.

FIG. 5 shows another example of an LED array 500 showing an with where groupings of LEDs spaced out different radiation wavelengths in order to provide an overall mix of radiation wavelengths that mimic sunlight and provide an even environment for analyzing gemstones.

In some examples shown in FIG. 5, groupings of LEDs may be repeated along the length of an array in rows. By placing rows of LEDs that generate light with the same wavelength, next to rows of LEDs that generate different wavelengths, a mixture of wavelengths may be generated that achieve a desired combination. Any number of rows or columns of LEDs in different arrangements, with each row generating a different wavelength, may allow for mixing and matching of lights as desired.

In the FIG. 5 example, seven rows of LEDs are repeated with two rows 502, 504 at the top having the same LEDs that generate a particular wavelength spectrum. Then, next to the first two rows is a third row 506 of LEDs that produce a different wavelength spectrum from the first two rows 502, 504. Then in FIG. 5 is shown, a center row 510 in the middle of the arrangement with a row of LEDs that generate yet a third different wavelength spectrum from the first two rows 502, 504 and the third row 506.

This center row 510 is then sandwiched between a fifth row 520, configured to generate a wavelength spectrum the same as the third row 506. Then finally, two more rows sixth and seventh 522, 524, configured to generate wavelength spectrums the same as the first two rows 502, 504.

Any number of rows in different arrangements may be used to combine wavelength spectrums generated by different LED arrays as described, the two-one-one-one-two sandwich arrangement described in FIG. 5 being only one example. Other arrangements such as one-one-one may be used, as well as two-one-two, or any other arrangement of LED arrays.

Figure 6:
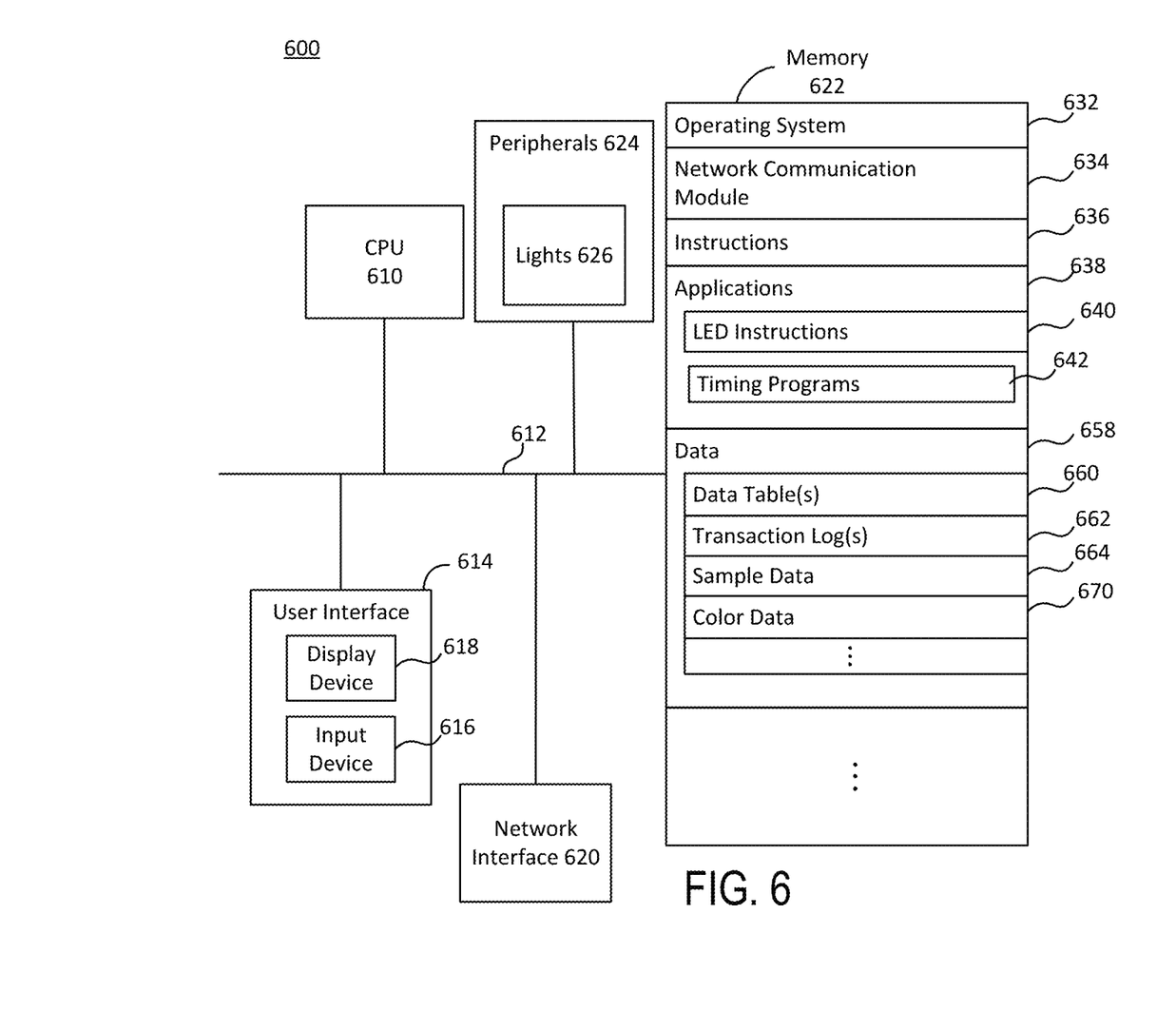
FIG. 6 show an example computing system to be used according to the embodiments described herein.

In some examples, the LED arrangement of FIG. 5 may include or be in communication with a computing system described in FIG. 6. Such a computing system may be configured to turn on and off the LED lights, alone or in combinations programmed for timing. In some examples, such timing may be to change the wavelength spectrums emitted by the different LEDs at different times as described herein.

Diffuser Examples

In some examples, the LED embodiments described herein may include light distribution for analysis of fancy shaped stones. Diffusing power may be useful for reviewing fancy shaped stones. Glass diffusers may be used with any of the arrangements described herein to diffuse incoming light and reduce directionality in the light beam. Glass diffusers can be made to a range of surface roughness/diffusion from fine etched micron surfaces to course grit grinding or sandblasted. In some examples, diffuse with a #100 grid on both sides may be used.

Material may be UV-transparent glass (such as BK7 or Fused Silica) or UV-transparent acrylic. Size may be 203.2 mm+/−0.2 mm×635 mm+/−0.2 mm. In some examples, the thickness may be 3 mm+/−0.2 mm. In some examples, the surface finish may be float grinding or rough grinding. In some examples, there may be no coating on the material, all as non-limiting examples.

In some examples, a Holographic diffuser may be used. In some examples, such a holographic diffuser may include Diffusing Angles Ranging from 0.5-50°, Fused Silica Substrate Offers 70% Transmission at 200 nm, Homogenous Light Distribution, Standard Holographic Diffusers Also Available, with Common Specifications of an Operating Temperature (° C.): −40 to +170, with a Substrate of Fused Silica (Corning 7980), with a Transmission (%): Typical: 90, with a Wavelength Range (nm): 200-1500, with Construction mounted, with a Mount Thickness (mm): 4.7±0.1, all as non-limiting examples.

In some examples, White diffusing glass may be used. Such a white diffusing glass may include Semi-Opaque White Glass, Highly Diffusive to Create Even Illumination, it may be Diffusive on Both Surfaces, with some Common Specifications of either Coated or Uncoated, with a Substrate of White Diffusing Glass, with a Thickness (mm): 1.25±0.1, with a Wavelength Range (nm): 400-700, all as non-limiting examples.

In some examples, Ground glass diffuser may be used. Such a ground glass diffuser may be available in Sizes Ranging from 5 mm Diameter to 250 mm Square with features such as Low Scatter Loss, Evenly Ground Surface for Even Diffusion, Fused Silica Substrates Available, with Common Specifications of either Coated or Uncoated, with a substrate of Float Glass with a Thickness (mm): 1.60, with a Wavelength Range (nm): 350-2000.

In some examples, a Light shaping diffuser may be used. Such a light shaping diffuser may include holographic patterns embedded on polycarbonate film or rigid sheets that are capable of shaping light energy. Such etched patterns may be used to create a pseudo-random surface to manipulate light by changing the direction of its energy.

Example Computer Devices

FIG. 6 shows an example computing device 600 which may be used in the systems and methods described herein. In the example computer 600 a CPU or processor 610 is in communication by a bus or other communication 612 with a user interface 614. The user interface includes an example input device such as a keyboard, mouse, touchscreen, button, joystick, or other user input device(s). The user interface 614 also includes a display device 618 such as a screen. The computing device 600 shown in FIG. 6 also includes a network interface 620 which is in communication with the CPU 620 and other components. The network interface 620 may allow the computing device 600 to communicate with other computers, databases, networks, user devices, or any other computing capable devices. In some examples, alternatively or additionally, the method of communication may be through WiFi, cellular, Bluetooth Low Energy, wired communication, or any other kind of communication. In some examples, alternatively or additionally, the example computing device 600 includes peripherals 624 also in communication with the processor 610. In some examples, alternatively or additionally, peripherals include lights 626. In some examples, computing device 600 a memory 622 is in communication with the processor 610. In some examples, alternatively or additionally, this memory 622 may include instructions to execute software such as an operating system 632, network communications module 634, other instructions 636, applications 638, applications to instruct LED drivers 640, applications to time programs of lights 642, data storage 658, data such as data tables 660, transaction logs 662, sample data 664, color data 670 or any other kind of data.

CONCLUSION

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the description pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A system comprising:
a main body including a stage and a radiation source;
wherein the radiation source is configured between 7 and 9 inches above the stage to emit radiation onto the stage, and the radiation source includes an array of Light Emitting Diode (LEDs) sets, the array including at least four LED sets,
wherein the at least four LED sets are spaced one half inch apart, and
each LED set including four LEDs with one Red, one Ultraviolet (UV), one White with a correlated color temperature of about 5500K as a base spectrum, and one White with a correlated color temperature of about 6500K as a base spectrum;
wherein the main body includes a holographic diffuser with diffusing angles ranging from 0.5 degrees to 50 degrees.

2. The system of claim 1 wherein the UV LEDs produce a wavelength between 350-400 nm and the Red LEDs produce a wavelength between 650-700 nm.

3. The system of claim 1 wherein the UV LEDs produce a wavelength about 365 nm and the Red LEDs produce a wavelength about 650 nm.

4. The system of claim 1 wherein the light diffuser is a ground glass diffuser.

5. The system of claim 1 wherein the stage and the radiation source are configured between 8 and 9 inches apart in the main body.

6. The system of claim 1 wherein the radiation source combination of LEDs each include an additional UV, and an additional Red.

7. The system of claim 1 wherein the LEDs produce illuminance between 2000-4500 lux at the stage.

8. The system of claim 1 wherein the LEDs have a Color Rendering Index (CRI) above 90.

9. The system of claim 1 wherein the LEDs have a Color Rendering Index (CRI) above 95.

10. A system comprising:
a flat stage for gemstone samples;
a radiation source configured between 8 and 10 inches above the flat stage;
wherein the radiation source includes a linear arrangement of groups of Light Emitting Diodes, (LEDs), each group including one Ultraviolet (UV) light wavelength range, and one Red light wavelength range, one White light with a correlated color temperature of about 5500K as a base spectrum, and one White light with a correlated color temperature of about 6500K as a base spectrum;
wherein the group of LEDs is a two row by two column arrangement,
wherein the one White light with the correlated color temperature of about 5500K is in a first of the two columns and the one White light with the correlated color temperature of about 6500K is in a second column of the two columns.

11. The system of claim 10 wherein the LEDs in the UV light range produce wavelengths between 350-400 nm and the LEDs in the Red light range produce wavelengths between 650-700 nm.

12. The system of claim 10 wherein the LEDs produce illuminance between 2000-4500 lux at the stage, and the LEDs have a Color Rendering Index (CRI) above 90.

13. The system of claim 10 wherein the radiation source includes a holographic diffuser with diffusing angles ranging from 0.5 degrees to 50 degrees.

* * * * *